United States Patent

[11] 3,574,492

| [72] | Inventor | Robert E. Schwary |
| | | Kalamazoo County, Mich. |
| [21] | Appl. No. | 861,350 |
| [22] | Filed | Sept. 26, 1969 |
| [45] | Patented | Apr. 13, 1971 |
| [73] | Assignee | General Signal Corporation |

[54] BUSHING ARRANGEMENT FOR ROTARY SHAFTS
14 Claims, 3 Drawing Figs.

| [52] | U.S. Cl. | 418/206, 308/72 |
| [51] | Int. Cl. | F01c 1/18 |
| [50] | Field of Search | 418/131, 132, 133, 134, 135, 205, 206; 308/72 |

[56] References Cited
UNITED STATES PATENTS

| 470,202 | 3/1892 | LaCroix | 308/72 |
| 2,295,139 | 9/1942 | Topanelian, Jr. | 308/72 |
| 3,003,425 | 10/1961 | Flowers | 418/135 |
| 3,115,373 | 12/1963 | Alexander | 308/72 |
| 3,270,680 | 9/1966 | Rich | 418/206 |
| 3,476,447 | 11/1969 | Boyd | 308/72 |

Primary Examiner—Carlton R. Croyle
Assistant Examiner—Wilbur J. Goodlin
Attorney—Dodge and Ostmann ABSTRACT: A scheme for reducing corner loading on a plain bearing or bushing employed to support a rotary shaft, such as the gear-carrying shaft of a gear pump or motor, which is subjected to unbalanced radial loads. The scheme consists of a tapered clearance space formed between the outer periphery of the bushing and the wall of the bore in the supporting structure in which the bushing is secured. This space is at least coextensive with the load zone of the bushing in the circumferential direction and extends longitudinally from the overloaded end of the bushing a distance greater than one-half the length of the bushing, but not so far as to preclude a secure fit between the bushing and the bore. Preferably the clearance space surrounds the bushing, and extends over about three-fourths the length of the bushing.

PATENTED APR 13 1971

3,574,492

INVENTOR
ROBERT E. SCHWARY

BY *Dodge & Ostmann*

ATTORNEYS

BUSHING ARRANGEMENT FOR ROTARY SHAFTS

BACKGROUND AND SUMMARY OF THE INVENTION

In a heavily loaded shaft and bearing arrangement, such as that employed in high-pressure gear pumps and motors, the bearing loads are calculated on the assumption that the load is uniformly distributed over the full length of the bearing. However, the validity of this assumption depends upon perfect bearing alignment and zero shaft deflection in the region between the support bearings, and obviously neither of these conditions is realized in practice. If the pump employs roller bearings, shaft misalignment and deflection can be compensated to some extent by crowning the rollers and certain other modifications. Therefore, while the life of these bearings may be reduced somewhat if the degree of misalignment is great, instant failure of the bearings under full load rarely, if ever, occurs. On the other hand, if the shaft is supported by plain bearings or bushings, the situation is quite different.

In the case of a bushing, the load is supported by an oil film generated by the hydrodynamic action resulting from rotation of the shaft. The thickness of this film decreases as the shaft speed decreases or the load increases; therefore, at certain values of these two operating conditions, partial or full metal-to-metal contact between the shaft and the bushing can occur. While calculations may indicate that the unit loading on the bearing is sufficiently low to insure against breakdown of the oil film under the anticipated operating conditions, shaft misalignment or deflection can reduce the effective support area and produce a corner loading condition. In this instance, the full load is concentrated on only a small portion of the bushing length adjacent the end of the bushing, and consequently shaft-to-bushing seizure will occur under conditions much less severe than those predicted by the design calculations. And, it should be noted, this type of failure occurs instantly and is not a function of time.

Comparison tests conducted during an investigation of this seizure problem revealed that pumps having cast iron housings could not operate consistently at an acceptable performance level which was achieved regularly by comparable pumps having aluminum housings. The housings of the aluminum pumps carried a total hydraulic pressure load about double that imposed on the iron housings, and thus were stressed to a higher level, but the calculated unit loading on the bushings in the two types of pump were essentially the same, and both designs employed components of equal quality. Yet, the wear patterns on the bushings demonstrated that the shaft load in the aluminum pumps was distributed over a greater percentage of the bushing length than the corresponding load in the iron pumps. These tests lead me to conclude that the higher stress level and the lower modulus of elasticity of the material used in the housing of the aluminum pump enabled this housing to deflect sufficiently under the load imposed on the bearing system to permit the bushings to align themselves with the deflected and/or misaligned shafts. In this way, the shaft load would be distributed over a greater portion of the bushing length, and the unit loading at the corner of each bushing would be kept within a tolerable limit. With this conclusion as the premise, it then became the object of the present invention to find a way of providing a similar degree of flexibility in bearing support structures made of more rigid materials and subjected to lower stress levels.

According to this invention, severe corner loading is avoided by providing a clearance space between the outer periphery of the bushing and the wall of the bore in which the bushing is secured. This space is tapered to a maximum radial width at the overloaded end of the bushing, is at least coextensive with the load zone of the bushing in the circumferential direction, and extends longitudinally from the overloaded end of the bushing a distance at least one-half the length of the bushing, but not so far as to preclude establishment of a secure fit between the bushing and the wall of the bore. In the case of bushings intended for use in reversible gear pumps and motors, the clearance space preferably surrounds the bushing and extends longitudinally about three-fourths the length of the bushing. The provision of this space allows the bushing to deflect slightly under load conditions and align itself with the shaft. As a result, the load applied to the bushing by the shaft is distributed over a greater portion of the bushing length and severe corner loading is avoided. The effectiveness of the invention has been demonstrated by actual tests involving cast iron pumps of various sizes. In a representative case, one pump design employing the invention operated reliably at a pressure of 4,000 p.s.i. at a critical low speed of 500—600 r.p.m., whereas this same design incorporating a conventional bushing arrangement operated only inconsistently at a pressure of 2,500 p.s.i. and rarely at a pressure as high as 3,000 p.s.i. under the same low speed condition.

It should be noted that the prior art in the field of hydraulic gear pumps contains a proposal for reducing corner loading on the shaft bushings which involves the provision of a tapered clearance space between the shaft and the inner periphery of the surrounding bushing. Actual tests of this proposal in pump designs of the same type as those used in the evaluation of the present invention showed that it was not effective to cure the seizure problem.

BRIEF DESCRIPTION OF THE DRAWING

Several embodiments of the invention are described herein with reference to the accompanying drawing in which.

DESCRIPTION OF THE PREFERRED EMBODIMENT

Figure 1:
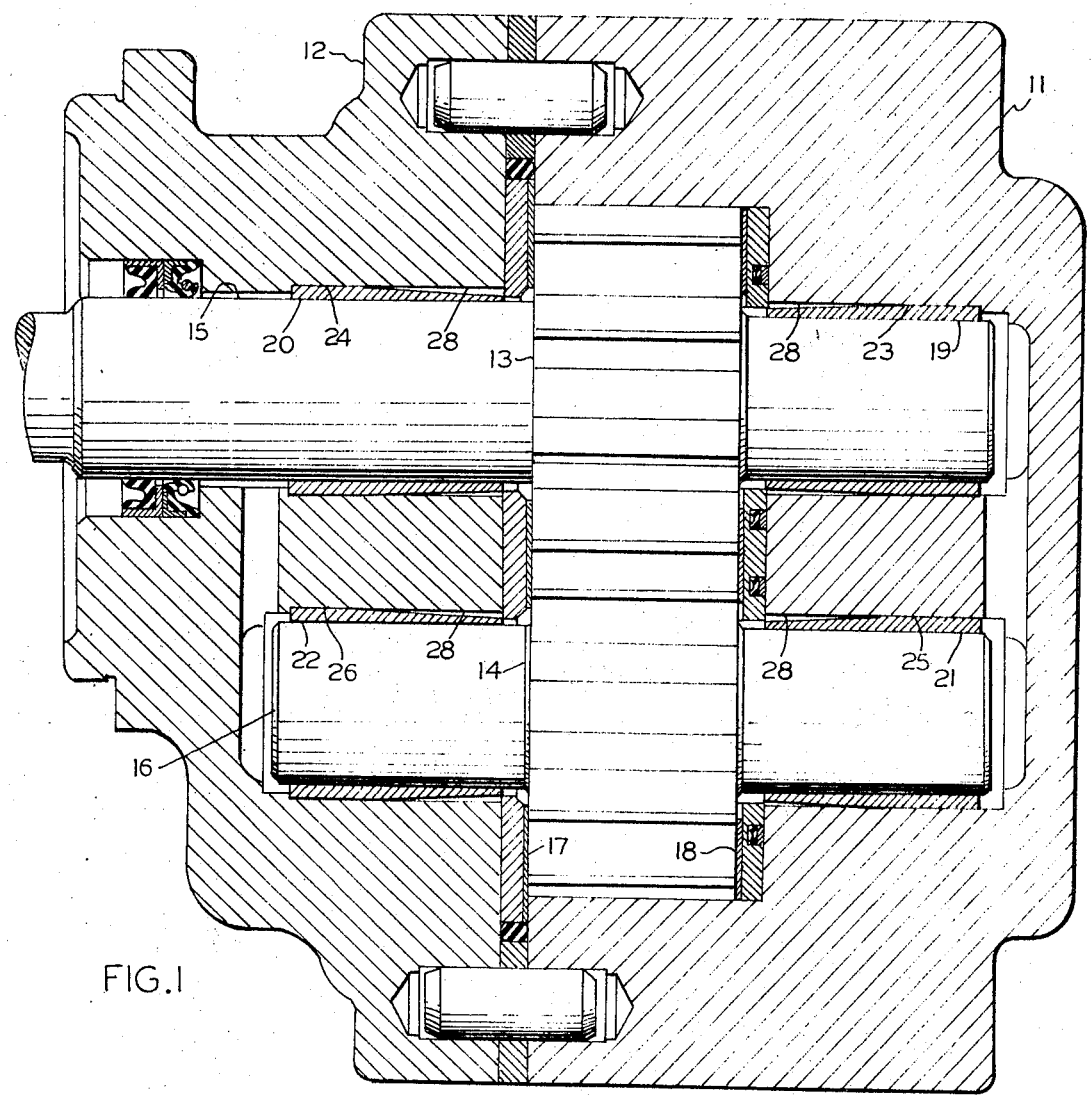
FIG. 1 is a cross-sectional view of a typical high-pressure, reversible hydraulic gear pump incorporating the improved bushing arrangement.

As shown in the drawing, the invention is embodied in a conventional gear pump including a cast iron housing consisting of two separable sections 11 and 12, a pair of meshing gears 13 and 14 which are carried by and fixed to rotate with a pair of shafts 15 and 16, respectively, a fixed wear plate 17, and a movable, floating wear plate 18. Shafts 15 and 16 are supported by four plain bearings or bushings 19, 20, 21 and 22 which are fitted tightly into cylindrical bores 23—26, respectively, formed in the housing sections. Preferably the bushings are of the thin-wall, bronze-lined, steel-backed type, but solid bronze bushings may be used. Although the bushings may be pressed into the housing bores, it is preferred that they be installed by a shrinking process because this increased the degree of interference of the fit and thus gives greater insurance against loosening of the bushings during operation. In either case, each bushing is subjected to a final precision boring operation after installation.

Figure 2:
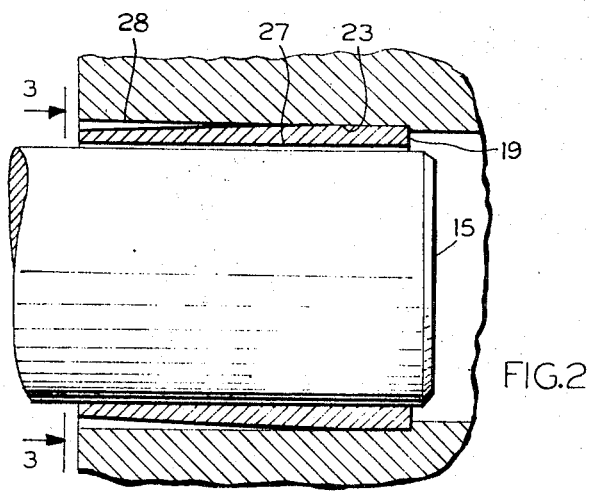
FIG. 2 is an enlarged view of one of the bushings shown in FIG. 1.
Figure 3:
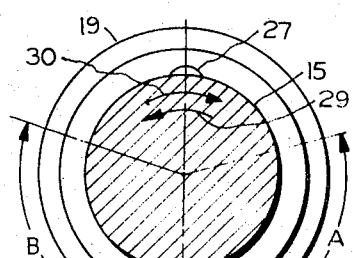
FIG. 3 is a sectional view taken on line 3—3 of FIG. 2.

The inner peripheral surface of each bushing is provided with a conventional longitudinal bearing feed groove, such as the groove 27 in bushing 19 shown in FIGS. 2 and 3, which is centered in the plane containing the axes of shafts 15 and 16 and is positioned at the side of the bushing remote from the mesh point of the gears 13 and 14. Passages (not shown) in the housing sections 11 and 12 and in the wear plates 17 and 18 deliver oil from the discharge zone of the pump to the inboard ends of the feed grooves, i.e., the ends adjacent the gears, and return to the inlet zone the oil which exits from the outboard ends of the grooves.

In accordance with the preferred teachings of the present invention, each of the bushings 19–22 is surrounded for a portion of its length by a uniformly tapered clearance space 28 which has its maximum radial width at the inboard end of the bushing and is formed by the cylindrical wall of the housing bore and a conical surface on the bushing. Each space 28 should extend longitudinally at least one-half the length of the bushing, since experience indicates that anything less than this produces no material improvement in performance, but it should not extend so far that the fit between the cylindrical portion of the bushing and the bore wall is unable to keep the bushing from working loose during operation. In the preferred design, the conical outer surface of the bushing spans about three-fourths of the length of the bushing, so this also is the nominal length of space 28. However, since the angle of taper of space 28 is small, and there is an interference fit between the bushing and the housing bore, it can be expected that manufacturing tolerances will cause the actual length of space 28 to vary somewhat from this value. The maximum radial width of clearance space 28 is quite small and normally is on the order of 0.002 inches.

The purpose of the clearance space is to permit deflection of the bushing under operating conditions and distribute the load over a sufficient length of the bushing to insure against localized breakdown of the oil film under the most severe combination of pressure and speed. Therefore, the specific dimensions of space 28 required for optimum performance may vary from installation to installation. However, experience with the invention shows that the length relationship and the radial width dimension mentioned above have enabled high pressure pumps of various volumetric capacities to afford acceptable performance.

The direction of action of the resultant load which each of the shafts 15 and 16 applied to its bushings depends upon pressure, speed and the direction of rotation of the shaft. Since the illustrated pump is reversible, it follows that the load zone of each bushing, i.e., the circumferential portion of the bushing which can be called upon to supply the reaction to the resultant load, will have a considerable angular width. This is illustrated in FIG. 3, wherein the arcs A and B designate the portions of the bushing 19 which can be loaded when shaft 15 rotates in the directions of arrows 29 and 30, respectively. Theoretically, the invention requires only that clearance space 28 be coextensive with the load zone A, B, but, as a practical matter, it is easier to use a clearance space which surrounds the bushing. However, regardless of which approach is used, it is imperative that the bushing not be installed in a cocked position wherein it is in contact with the wall of the housing bore in the region of the load zone.

Although the invention is described herein as applied to a high-pressure gear pump, it will be evident that it is useful in other environments.

I claim:

1. In an apparatus including a bushing tightly fitted into a bore in a structural member and supporting a rotary shaft, the improvement which comprises a clearance space 28 between the outer periphery of the bushing 19 and the wall of said bore 23, the space;
   a. being at least coextensive with the load zone A or B or A, B of the bushing in the circumferential direction;
   b. extending longitudinally from one end of the bushing a distance at least one-half the length of the bushing; and
   c. being tapered to a maximum radial width at said one end of the bushing.

2. The improvement defined in claim 1 in which the clearance space 28 is an annulus which surrounds the bushing 19.

3. The improvement defined in claim 1 in which the clearance space 28 extends longitudinally a distance of about three-fourths the length of the bushing.

4. The improvement defined in claim 1 in which the clearance space 28 is tapered uniformly.

5. The improvement defined in claim 2 in which the clearance space 28 is bounded radially by cylindrical and conical surfaces.

6. The improvement defined in claim 5 in which;
   a. the wall of said bore 23 is cylindrical; and
   b. said conical surface is on the bushing 19.

7. The improvement defined in claim 6 in which the clearance space 28 extends longitudinally a distance of about three-fourths the length of the bushing.

8. In a high-pressure gear pump or motor including a pair of meshing gears each of which is carried by a shaft which is supported by a pair of bushings located at opposite sides of the gear and tightly fitted into bores formed in a housing, the improvement which comprises a clearance space 28 between the outer periphery of each bushing 19—22 and the wall of the mating bore 23—26, the space
   a. being at least coextensive with the load zone A or B or A, B of the bushing in the circumferential direction;
   b. extending longitudinally from the end of the bushing nearer the gear a distance at least one-half the length of the bushing; and
   c. being tapered to a maximum radial width at said end of the bushing nearer the gear.

9. The improvement defined in claim 8 in which each clearance space 28 is an annulus which surrounds the associated bushing 19, 20, 21 or 22.

10. The improvement defined in claim 8 in which each clearance space 28 is tapered uniformly.

11. The improvement defined in claim 9 in which each clearance space 28 is bounded radially by cylindrical and conical surfaces.

12. The improvement defined in claim 11 in which:
   a. the wall of each of said bores 23—26 is cylindrical; and
   b. said conical surface is on the bushing.

13. The improvement defined in claim 10 in which each clearance space 28 extends longitudinally a distance of about three-fourths the length of the bushing.

14. The improvement defined in claim 12 in which each clearance space 28 extends longitudinally a distance of about three-fourths the length of the bushing.